United States Patent Office 3,442,078
Patented May 6, 1969

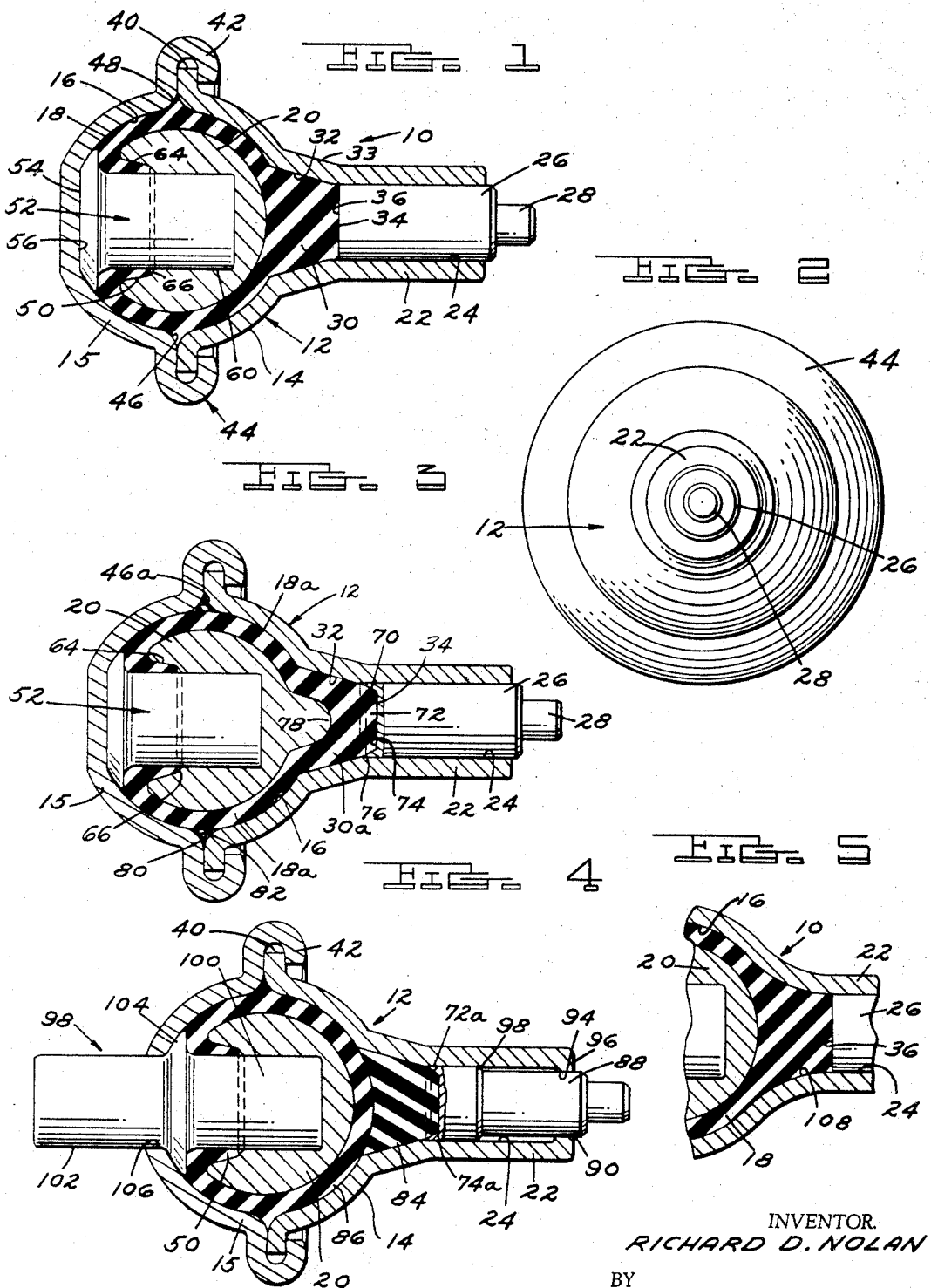

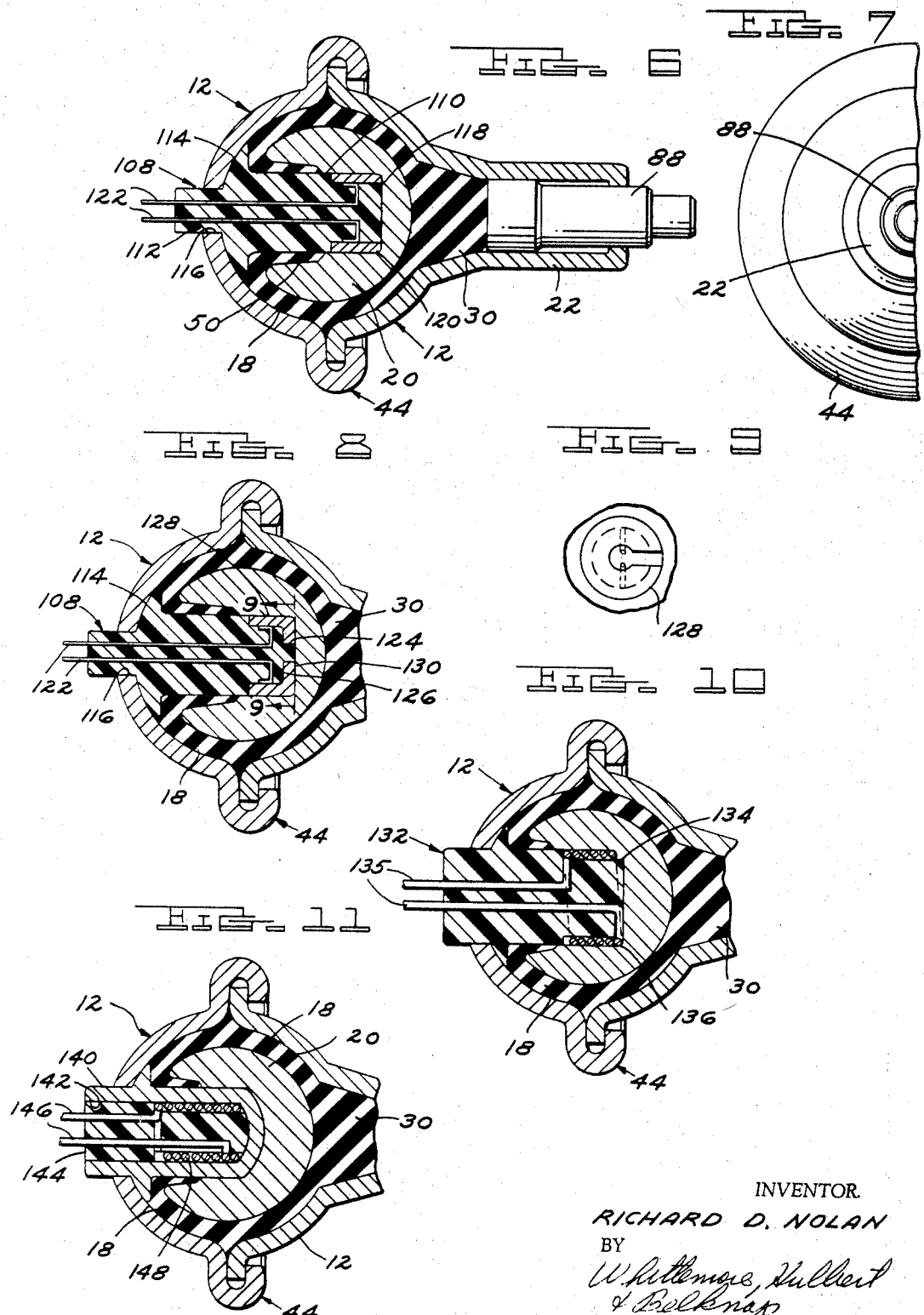

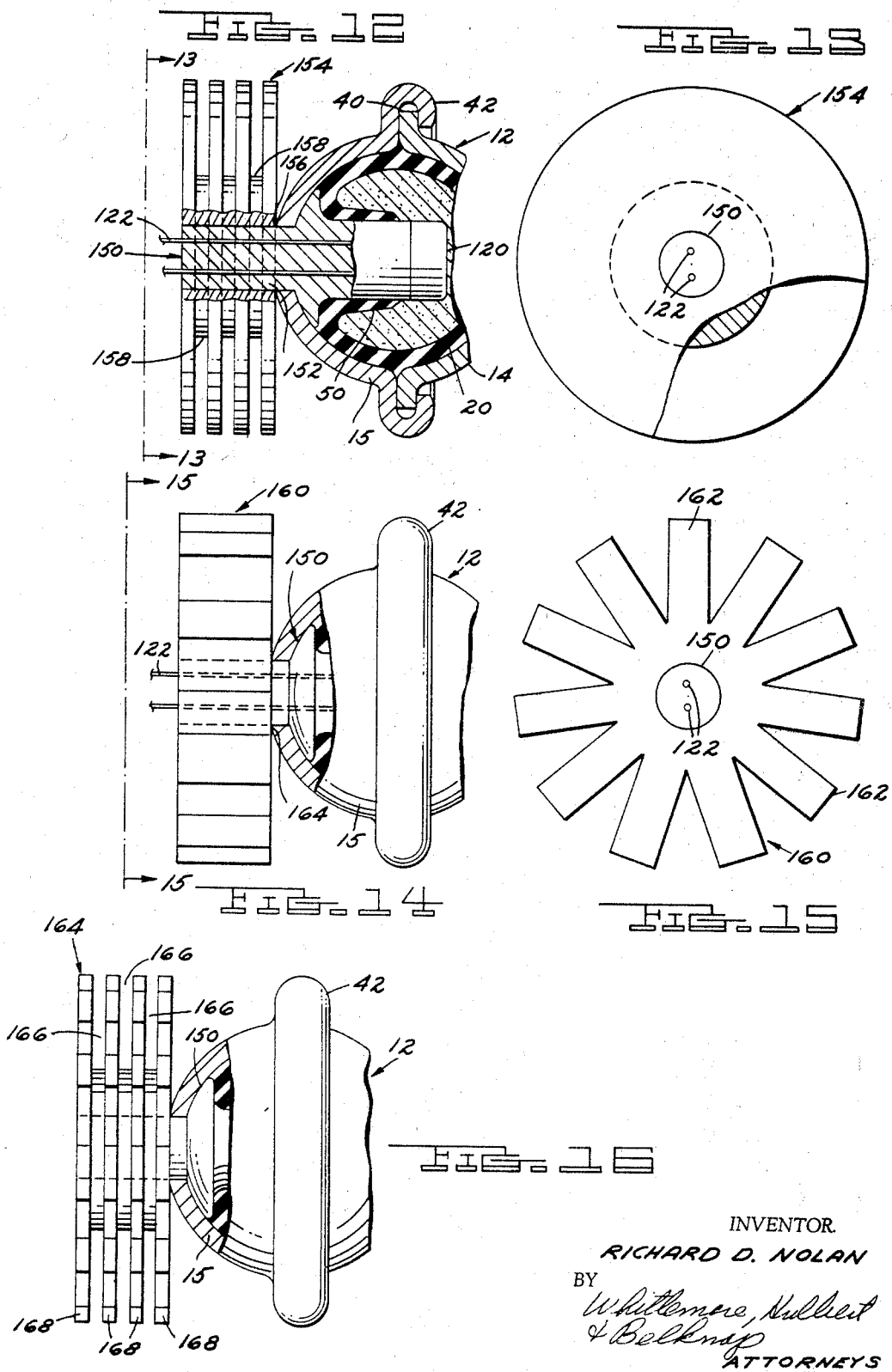

3,442,078
THERMO-ACTUATOR
Richard D. Nolan, Birmingham, Mich., assignor to Advance Stamping Company, Detroit, Mich., a corporation of Michigan
Continuation-in-part of application Ser. No. 194,464, May 14, 1962. This application Dec. 10, 1962, Ser. No. 243,344
Int. Cl. F03g 7/06; G01k 5/32
U.S. Cl. 60—23      21 Claims The present invention relates to temperature responsive control devices and is a continuation-in-part application of my copending application U.S. 194,464, entitled, "Automotive Radiator Thermostat Flapper Type Valve," which was filed on May 14, 1962, now abandoned. More particularly, the present invention relates to a control device or actuator which is operative in response to a rise in temperature of a predetermined magnitude to produce a thrust of a considerable magnitude which is effective to actuate or otherwise communicate such condition to suitable control equipment connected thereto.

Temperature responsive actuators of the aforementioned type are in widespread use in industry for providing accurate and positive control of various processes and apparatuses in accordance with the surrounding thermal environment. As an example, the temperature responsive actuator may be used with thermostatically operated valves used in cooling systems of automobiles. Temperature responsive actuators of this general type conventionally employ suitable heat expansible materials which are designed to undergo a comparatively large controlled change in volume over a selected temperature range. The change in volume of the heat expansible material is transmitted through suitable flexible diaphragms to a movable member which in turn transmits a high thrust to the equipment associated therewith.

It is a problem in the art to effectively seal the heat expansible material within the housing of a temperature responsive actuator in view of the extremely high pressures that are conventionally developed therein. Any seepage of the heat expansible material from such a temperature responsive actuator induces a lost motion operation therein which causes progressively greater deviations from its original calibrated actuating characteristics so as to render the actuator unsuitable for continued use.

Repeated flexing of the resilient diaphragm, as occasioned during the operating life of a temperature responsive actuator, has in many instances caused premature failure of the actuator by rupture or bursting of the diaphragm. Additional problems have also been encountered in connection with the manufacture and assembly of the temperature responsive actuators. The problems stated hereinbefore have been substantially eliminated by the present invention so as to assure an integrally sealed actuator that is substantially completely filled with the heat expansible material and which is appropriately calibrated for continued use over a long period of time.

It is an object of the present invention to provide an improved temperature responsive actuator which employs a self-contained resilient capsule in which a heat expansible material is disposed and to which heat is transferred through a metallic pin sealed in the capsule and disposed with the head portion thereof in thermal conducting contact with the surrounding housing.

Another object of the present invention is to provide an improved temperature responsive actuator which provides for an amplification of the movement of a piston in response to the expansion or contraction of the heat expansible material in the resilient capsule.

Still another object of the present invention is to provide a thermal responsive actuator of the aforementioned type wherein the heat transfer pin is located on the same longitudinal axis as the piston of the actuator.

A further object of the present invention is to provide an actuator of the type just described wherein the heat transfer pin has inner and outer portions to facilitate the addition or removal of the heat to or from the actuator respectively.

A still further object of the present invention is to provide an actuator which includes electrically operated heating means such as a heating ring, coil, or the like in heating conducting contact with the heat expansible material in order to expand the heat expansible material upon energization of the heating means.

Another object is to provide an actuator which has a heat conducting pin which has the same axis as the piston, electrically operated heating means carried by and insulated from said pin, and heat dispersing means mounted on the outer portion of the pin for facilitating the removal of heat from the actuator upon de-energization of the electrically operated heating means.

It is thus another object of the present invention to provide an improved low cost thermal responsive actuator having certain advantages contributing to design, durable operation, accurate control, efficiency, reliability and long life as well as ease of maintenance.

Further objects and advantages of the present invention will be apparent from the following description, reference being had to the accompanying drawings wherein a preferred form of the present invention is clearly shown.

FIGURE 1 is a longitudinal sectional view through a temperature responsive actuator constructed in accordance with one of the embodiments of the present invention.

FIGURE 2 is an end elevational view of the temperature responsive actuator shown in FIGURE 1.

FIGURE 3 is a longitudinal sectional view through a temperature responsive actuator constructed in accordance with another embodiment of the present invention.

FIGURE 4 is a longitudinal sectional view through a temperature responsive actuator constructed in accordance with still another embodiment of the present invention and which employs various features including a separate cushion, a tubular extension incorporating stop means thereon for regulating the maximum outward reciprocating movement of the piston, and an elongated heat transfer pin having inner and outer portions.

FIGURE 5 is a fragmentary longitudinal sectional view of still another embodiment of the present invention which includes an amplification section in the throat portion thereof for amplifying the reciprocatory movement of the piston in response to expansion and contraction of the heat expansible material contained in the resilient capsule.

FIGURE 6 is a longitudinal sectional view through an electrically operated temperature responsive actuator and constituting still another embodiment of the present invention.

FIGURE 7 is a fragmentary end elevational view of the electrically operated actuator shown in FIGURE 6.

FIGURE 8 is a fragmentary longitudinal sectional view of another embodiment of the electrically operated actuator.

FIGURE 9 is a transverse end view of the heating ring taken on line 9—9 of FIGURE 8.

FIGURE 10 is a fragmentary longitudinal sectional view of still another embodiment of the electrically operated actuator.

FIGURE 11 is a fragmentary longitudinal sectional view of another embodiment of the electrically operated actuator.

FIGURE 12 is a fragmentary longitudinal view, partly in section, of another embodiment of the electrically operated actuator and which has a heat dispersing element associated therewith.

FIGURE 13 is an end view of the embodiment illustrated in FIGURE 12 looking in the direction of arrows 13—13 in FIGURE 12, with parts broken away and in section.

FIGURE 14 is a fragmentary longitudinal view, partly in section, of another embodiment of the electrically operated actuator illustrated in FIGURES 12 and 13.

FIGURE 15 is an end view looking in the direction of arrows 15—15 of FIGURE 14 and illustrating in particular the configuration of the heat dispersing element.

FIGURE 16 is a fragmentary longitudinal view, partly in section, of another embodiment of the electrically operated actuator illustrated in FIGURES 12 and 13.

Referring now in detail to the drawings and in particular to FIGURE 1, a temperature responsive actuator is designated by the numeral 10 and is provided with a two-piece housing or casing generally indicated at 12. The housing 12 includes a flanged cup-shaped body 14 and a flanged cup-shaped retainer or cap 15 of a configuration such that on assembly thereof into an integral unit, a cavity or chamber 16 is formed in which a resilient capsule 18 is located. The body 14 and the cap 15 are preferably constructed of a high strength metal having a relatively high coefficient of thermal conductivity such as, for example, copper, aluminum, and brass in order to facilitate transmission of heat from the medium surrounding the housing 12 through a heat transfer pin 52 to a heat expansible material 20 contained within the resilient capsule 18.

The heat expansible material 20 in the capsule 18 may comprise any suitable material which undergoes a relatively large change in volume over a selected temperature range and may include any material such as those disclosed in United States Patent No. 2,259,846, issued to Vernet et al. Heat expansible materials of this general type generally comprise waxes or blends of waxes which are formulated so as to achieve the desired volume change at any particular temperature level. The change in volume of such wax blends is primarily attributable to a change in volume on the transition of the material from a solid state to a liquid state and vice versa. The heat expansible materials may also incorporate heat conductive particles therein such as copper or other metallic fines, for example, which accelerate the transfer of heat through the material with a corresponding increase in the sensitivity of the actuator to changes in the thermal environment.

The resilient capsule 18 is made of any suitable, substantially incompressible material such as natural or synthetic rubber, or other suitable synthetic plastic materials which are able to withstand repeated expansion and contraction as occasioned by the expansion and contraction of the heat expansible material contained therein. The resilient materials are further selected so as to be resistant to degradation from the elevated temperatures to which they are exposed and to be chemically resistant to the heat expansible material contained therein and any suitable lubricants applied to the walls of the chamber 16 to minimize friction during relative movement therebetween. For this purpose, a variety of natural and synthetic rubbers have been found particularly suitable, providing excellent resilient characteristics and stability against degradation and chemical attack.

The body 14 of the two-piece housing 12 is formed with a tubular extension 22 which is integrally connected thereto and is formed with a circular bore 24 along the outer end portion thereof of a substantially uniform cross section in which a piston 26 is slidably mounted. The outer end of the piston 26 may be suitably provided with a tang or stub shaft 28 which can be operatively connected to a controlled device which is effective to initiate the appropriate action in response to actuation thereof by the outward and inward reciprocatory movement of the piston 26 as further described in my copending application U.S. 194,464. The actuated component of the controlled device is conventionally spring loaded so as to urge the piston 26, to the fully retracted position. This inward force is overcome by the pressure exerted by the heat expansible material when it attains a preselected temperature forcing the piston 26 outwardly.

Reciprocation of the piston 26 to and from a retracted position to a projected position along the longitudinal axis of the housing 12, is achieved by the axial outward deflection of a cushion 30 integrally affixed to a substantially spherical wall of the resilient capsule 18 and disposed with its outer face 34 in abutting contact against the head or inner face 36 of the piston 26. The cushion 30 is positioned in a throat section 32 of the tubular extension 22 and is disposed in communication with the circular bore 24 at one end and the chamber 16 at the other end. The throat section 32 is defined by wall portions 33 which are flat and tapered as shown in FIGURE 1. In the particular construction of the cushion 30 shown in FIGURE 1, the face 34 thereof positioned in contact with the inner face 36 of the piston 26 is flat.

The body 14, which constitutes the upper part of the housing 12, is provided with an outwardly extending flange 40. The cap 15, which is spherical and constitutes the lower part of the housing 12, is provided with an outwardly extending, inwardly turned U-shaped flange 42 which is adapted to receive the outwardly extending flange 40 provided on the body 14. The arms of the flange 42 are pressed together after the assembly of the housing parts to hold the parts together as illustrated. With such a construction, the flanges 40 and 42 form an annular rim 44. The spherically shaped cap 15 is adapted to be received in a spherical socket as described in my copending application. The joinder of the mating faces of the flanges 40 and 42 form an annular V-shaped recess 46 extending around the interior of the chamber 16. The prevention of distortion and separation of this annular flange connection and improved seating characteristics of the resilient capsule 18 is achieved by forming an annular integral V-shaped ridge 48 around the periphery of the resilient capsule 18 which is contoured to conform with the V-shaped recess 46 substantially completely filling the interior thereof. During the expansion of the cushion 30, as will be subsequently explained, the ridge 48 is free to move away from the recess 46 and returns to the position illustrated upon contraction of the cushion 30.

The resilient capsule 18 as shown in FIGURE 1 is provided with an inwardly extending sealing sleeve or lip seal 50 which is integrally affixed to the wall portions thereof and in which a heat transfer pin 52 is sealingly disposed. The sealing sleeve 50 is positioned so that the longitudinal axis thereof is disposed in substantial alignment with the longitudinal axis of the tubular extension 22. The heat transfer pin 52 comprises a head portion 54 which is adapted to be seated in firm heat conducting contact with an appropriately contoured wall portion 56 of the cap 15 and serves to maintain the resilient capsule 18 in appropriate alignment with the extension 22. The contact of the head portion 54 with the housing 12 provides a path for transmitting heat from the thermal environment surrounding the actuator 10 through the housing 12 and thence through the heat transfer pin 52 to the heat expansible material 20 contained within the resilient closed or sealed capsule 18.

The shank portion 60 of the heat transfer pin 52 projects inwardly beyond the end of the sealing sleeve 50 and is disposed in thermal conducting contact with the heat expansible material 20 therein. In view of the relatively high pressures developed within the resilient capsule 18 during the expansion of the heat expansible material 20, good sealing characteristics must exist between the sealing sleeve 50 and the shank portion 60 of the heat transfer pin 52 to prevent any leakage of the heat expansible material 20 therefrom. This is achieved by providing the peripheral surface of the sealing sleeve 50 with a multiple tapered configuration against which the pressure acts forming a more perfect seal between the sealing sleeve 50 and peripheral surface of the pin 52 as the pressure increases. In the specific arrangement shown in FIGURE 1, the periphery of the sealing sleeve 50 is provided with an elongated tapered surface 64 extending for the major portion of the length thereof and a short chamfer or tapered surface at the end thereof forming a sealing lip 66 which, in response to circumferentially directed pressure thereagainst is effective to tightly clamp over the periphery of the heat transfer pin 52 preventing any channeling of the heat expansible liquid 20 therebetween. Conventionally, the diameter of the bore through the sealing sleeve 50 is controlled to be slightly smaller than the diameter of the shank portion 60 of the heat transfer pin 52 to provide for a tight stretch fit which further enhances the sealing characteristics of the capsule assembly.

FIGURES 3–11 relate to various features of the present invention and where applicable, the same numerical designations, as used for FIGURES 1 and 2, will be utilized to represent similar parts.

As illustrated in FIGURE 3, the cushion 30a of capsule 18a is provided with a chamfer 70 around the edges of the cushion face 34 so as to form a male tip or tab 72 which is received in the female annular recess 74 provided in the end face 36 of the piston 26. The walls of the tab 72 are in surface-to-surface contact with the corresponding walls of the recess 74.

The chamfer 70 provides for a gradual initial outward reciprocation of the piston 26 and also provides a relatively small annular gap 76 which serves as a reservoir for a suitable lubricant for minimizing frictional resistance between the periphery of the piston 26 in the circular bore 24 and the periphery of the cushion 30a in the throat section 32.

FIGURE 3 also illustrates another constructional feature of the capsule wherein the inner wall portion of the resilient capsule 18a is provided with a dimple or depression 78 disposed rearwardly of and substantially centrally of the integral cushion 30a which enhances the flexure characteristics of the cushion 30a during expansion and contraction of the heat expansible material 20 in the capsule. The use of a depression 78 can also be satisfactorily employed in the cushion 30 as shown in FIGURE 1 and may extend to a depth wherein the wall portions of the cushion 30 corresponds to a thickness no less than the wall portion of the resilient capsule 18. The use of depression 78 also allows more volume to receive the heat expansible material.

In addition, FIGURE 3 illustrates a V-shaped annular recess 46a in the interior of the housing 12. The recess 46a extends completely around the housing 12. The walls of the V-shaped recess 46a are spaced from the spherically shaped capsule 18a and define a relatively small or slight gap 80 between the housing 12 and resilient capsule 18a which receives an annular resilient solid ring 82 of substantially V-shaped cross-section. The ring 82 may be made of the same material as the capsule 18a but separate therefrom. In place of the ring 82, suitable lubricant may be used to reduce the frictional coaction between the periphery of the outside wall of the resilient capsule 18a and the inner wall of the chamber 16.

Still another alternate satisfactory form of a cushion is shown in FIGURE 4 wherein a cushion 84 is provided which is separate from the substantially closed capsule 86. The cushion 84 is provided with a tab 72a which is received in the annular recess 74a in a manner similar to the construction shown in FIGURE 4. The other end of the cushion 84 is arcuate and in contact with the substantially spherical wall of the resilient capsule 86.

FIGURE 4 also illustrates an arrangement wherein the tubular extension 22 is provided with a piston 88 which is slidably disposed therein. The piston 88 has an outer portion 90 of reduced diameter and an inner portion 92 of a diameter corresponding substantially to the diameter of the circular bore 24. The outer portion 90 is slidably disposed within a bore 94 at the outer end of the tubular extension 22 which may conveniently be formed by rolling or turning in the outer edge thereof so as to form therewith an annular flange 96. A shoulder 98 defined by the intersection of the outer portion 90 and inner portion 92 of the piston 88 is adapted to coact with the turned-in flange 96 providing for a positive stop of the piston 88 regulating its maximum outward travel.

FIGURE 4 also illustrates a modified heat transfer pin 98 which is elongated and has an inner stem 100 and an outer stem 102 on opposite sides of the head portion 104. The pin 98 has the same longitudinal axis as the piston 88. The inner stem 100 is disposed within the sealing sleeve 50 in the same manner as described for FIGURE 1. The head portion 104 is seated firmly against the corresponding wall of the housing 12 in heat conducting relationship therewith. The outer stem 102 extends outwardly from the cap 15 through an opening 106 provided therein. By providing the outer stem 102, the heat may be conducted to or from the heat expansible material 20 more rapidly as required in certain applications than when using the pin 52.

An alternate construction of the throat section of the tubular extension 22 is shown in FIGURE 5 wherein a throat section 108 is provided which is of a widely divergent or tapered configuration being of substantially greater cross section at a point contiguous to the resilient capsule 18 and progressively decreasing in cross section and forming a smooth transition with the circular bore 24 through the tubular extension 22. By virtue of this throat section 108 a unit linear outward movement of the cushion 30 produces a linear displacement of the piston 26 of a magnitude substantially greater than the linear movement of the diaphragmic wall of the capsule 18. During the outward movement of the piston, the cushion 30 and the wall of the resilient capsule 18 are deformed and move outwardly in conformance with the wall defining portions of throat section 108 and the circular bore 24 of the extension 22.

The incorporation of such an amplifying throat section 108 provides for increased sensitivity and more rapid response in a movement of the piston 26 as a result of changes in the temperature of the heat expansible material 20 contained in the resilient capsule 18. Accordingly, by appropriately controlling the ratio of the cross-sectional area of the throat section 108 at the points adjacent to the wall of the resilient capsule 18 and the face 36 of the piston, in addition to the selection of the appropriate blend of heat expansible material 20, the desired magnitude of actuation can be carefully controlled at any particular temperature level substantially enhancing the versatility and flexibility of the thermal responsive actuator 10.

The temperature responsive actuator shown in FIGURES 1–5 is extremely simple in construction and may be conveniently assembled by initially filling the resilient capsule 18 under vacuum with the appropriate heat expansible material 20 after which the heat transfer pin 52 or 98 is inserted in the sealing sleeve 50 so as to provide a sealed unit. The assembled capsule 18 is then inserted in the body 14 of the housing 12 after which the cap 15 is placed thereover and the flange 42 rolled over forming an integral assembly. In thermal actuators of the type shown in FIGURE 4, the piston 88 must first be inserted in the circular bore 24 followed thereafter by the separate resilient cushion 84 after which the resilient capsule 18a is placed in the appropriate position and the cap 15 secured to the body 14.

The temperature responsive actuator can be simply calibrated by allowing a predetermined gap between the face of the piston and the face of the cushion or by only filling the resilient capsule to a preselected level with the best expansible material. In so doing, the desired degree of lost motion can be incorporated in the temperature responsive actuator whereby movement of the piston does not occur until the gaps provided have been filled during the expansion of the heat-expansible material after which actuation thereof commences.

FIGURES 6–16 illustrate various embodiments of an electrically operated actuator. The actuator, exclusive of the electrical components, may include the various constructional features listed previously herein. The pin received within the integral seal for sealing the heat expansible material may be made from a heat conducting material or a non-heat conducting material as the application may require.

FIGURES 6 and 7 illustrate one form of the electrically operated actuator and are similar to FIGURES 1–4 with the exception of the heat transfer pin and the electrical components. In this embodiment the heat pin 108 is made from a non-heat conductive material. The pin 108 is axially aligned with the piston 88 and includes an inner stem 110 and an outer stem 112 on opposite sides of a head portion 114. The outer stem 112 can be smaller in cross-section than the inner stem 110 or equal thereto. The stem 112 extends outwardly from the housing 12 through an opening 116 provided therein. The inner end 118 of the stem 110 is reduced in cross-section and is provided with an annular heating ring 120 of suitable material such as the high resistant wire used in automobile cigarette lighters. A pair of electrical conductors or lead wires 122 extend axially through the pin 108 and have the inner ends thereof connected to the inner periphery of the heating ring 120. The heat pin 108 may be made, as an example, from a plastic material. The lead wires 122 are encased in the pin 108 during the formation thereof by a suitable molding operation. The ring 120, which forms the heating element, may be stamped or drawn or even coiled.

In operation, the lead wires 122 are connected to a suitable source of electrical energy and conduct the electrical energy to the heating ring 120 which is in contact with the heat expansible material 20. When the heating ring 120 reaches the proper temperature, the heat expansible material 20 expands in the same manner as previously described.

FIGURE 8 is similar to FIGURE 6 with the exception that the inner stem 110 of the non-heat conducting pin 108 is provided with an annular shoulder 124 and an abutment surface 126. The heating ring 128 has an inwardly turned, annular flange 130. The ring 128 is received on the reduced portion 118 of the stem 110 such that the annular flange bears against the annular shoulder 124. The heating element or ring 128 is connected to the lead wires 122. The operation of this embodiment is the same as the embodiment illustrated in FIGURES 6 and 7.

Generally, the heating rings 120 and 128 are pressed over the corresponding end of the non-heat conducting pin and thereby brought into contact with the corresponding ends of the lead wires 122.

FIGURE 10 illustrates an electrically operated actuator wherein the non-heat conducting pin 132 is provided with inner and outer stems of substantially the same diameter. The inner stem is slightly reduced in diameter as indicated by the numeral 134. A pair of lead wires 135 are encased in the pin 132 during the formation thereof. A heating element in the form of a coil 136 surrounds the reduced end portion 134 of the pin 132. The opposite ends of the coil 136 are electrically connected to the lead wires 135.

The lead wires may be suitably connected to a small voltage rheostat (24 volts) or other means common to the control industry. The heating coil 136 or the annular heating ring 120 or 128 is designed to expand the expansible material as required, depending on the application.

FIGURE 11 illustrates another embodiment of the electrically operated actuator wherein a heat transfer pin 140 having an inner bore 142 is mounted in the housing 12 in axial alignment with the piston. The heat transfer pin 140 is made of heat conducting material. A heat pin 144 is located in the bore 142. The heat pin 144 is made from non-conducting material such as plastic and has a pair of lead wires 146 encased therein. The inner ends of the lead wires are connected to a heating element in the form of a coil 148. The coil is in electrical contact with the inner walls of the heat transfer pin 140. The outer ends of the lead wires 146 are adapted to be connected to a relatively small rheostat as explained previously. The heating element 148 transfers heat therefrom to the heat transfer pin 140 which in turn is in heat conducting contact with the heat expansible material 20.

The embodiment illustrated in FIGURE 11 is desirable in certain applications where it is required to rapidly remove the heat from the heat expansible material. A heat transfer pin of suitable conducting material will facilitate the removal of the heat in the material of the capsule 18. The operation of this embodiment is the same as described for FIGURE 6. This embodiment therefore relates to the feature of providing a composite article in the form of a pin consisting of a heat conducting portion made from copper or other suitable material and a non-conducting portion made from plastic. The heating element attached to lead wires encased in the non-conducting material may be in the form of a heating ring or coil as explained previously.

The embodiments illustrated in FIGURES 12–16 differ from FIGURES 6–11 primarily in utilizing a pin made from a heat conducting material rather than from a non-heat conducting material. In such a case the heating element is mounted about or in the heat pin in one of the ways previously described but electrically insulated from the heat pin. The heating element is in heat conductive contact with the heat expansible material. The heat pin is also in contact with the material in order to allow the heat generated in the housing for outward actuation to be released so as to obtain a resonable prompt return of the piston to its original position upon de-energization or failure of the heating element.

In FIGURES 12 and 13, the actuator has a heat conducting transfer pin 150 received within the integral seal 50 and having the same longitudinal axis as the piston. The pin 150 has an outwardly extending portion 152. A pair of electrical conductors or lead wires 122 are located in the interior of the pin 150 and are insulated therefrom. The inner ends of the conductor 122 are connected to a heating element 120 which is in heat conducting contact with the heat expansible material 20. The heating element 20 is also insulated from the heat pin 150.

Mounted on the outer portion 152 of the pin 150 is heat dispersing means in the form of an annular disc or member 154 of heat-conducting material. The disc 154 is sleeved and fixed on the outer portion 152 and has the inner surface 156 in contact with the outer surface of the housing part 15. The disc 154 has a plurality of axially spaced, circumferentially extending grooves 158 provided on the outer periphery thereof.

The heat dispersing means provides additional area for dissipating the heat generated in the actuator upon failure or de-energization of the heating element 120. The grooves 158 permit air to move through the disc and contact various surfaces of the disc 154 so as to rapidly remove the heat from the actuator.

The embodiment illustrated in FIGURES 14 and 15 is similar to FIGURES 12 and 13 with the exception that another form of heat dispersing means is utilized. In this case a one-piece annular element 160 is utilized having a plurality of radially extending arms 162 on the outer periphery thereof. The inner surface 164 of the element 160 is in contact with the housing part 15.

The element 160 supplements the area provided by the heat transfer pin 150 in order to rapidly disperse the heat generated in the actuator upon de-energization thereof. The spaces between the arms or teeth 162 form channels for air. The air contacts the sides of the arms 162 and removes the heat therefrom.

The embodiment illustrated in FIGURE 16 is similar to FIGURE 12, with the exception that another form of heat dispersing means is utilized. This embodiment combines the features of the heat dispersing means illustrated in FIGURES 12–15. The annular element 164 includes a plurality of axially spaced, circumferentially extending grooves 166 on the outer periphery thereof. The annular sections 168 each include a plurality of radially extending arms similar to the arms shown in FIGURE 15. With such a construction greater surface area is provided on the heat dispersing means 164 than in the other embodiments whereby the air which moves through the grooves and the spaces between adjacent arms remove the heat from the actuator rapidly.

It should be understood that the various forms of heat dispersing means may be made in one piece or any number of parts.

What I claim as my invention is:

1. A temperature responsive actuator comprising an elongated hollow housing which is symmetrical about the longitudinal axis thereof, said housing including a cap having an outer surface which is part spherical on one end portion thereof and part cylindrical on the other end portion thereof and a cup-shaped body member which is part spherical, the spherical parts of said cap and said body member being provided with engageable laterally extending flanges and being joined together at the mating surfaces of said flanges, said housing defining a pair of axially aligned and connected chamber portions, one chamber portion being substantially spherical and including an endless transversely extending relatively shallow substantially V-shaped groove extending around the interior thereof along the line of joinder of said flanges, the other chamber portion terminating in a cylinder having a plunger extensibly movable therealong and having a throat forming an inner continuation of said cylinder and diverging from said cylinder to intersect said spherical chamber portion, a resilient capsule disposed in said housing and containing a heat expansible material therein, said capsule having a principal axis which is coincidental with the axis of said housing, said capsule being substantially spherical and in surface to surface contact with said spherical chamber portion, said capsule being provided on the exterior side thereof with a resilient cushion having a face which abuts the inner end of said plunger, said cushion being substantially located in and conforming to the shape of said throat, an annular V-shaped ridge extending around the outer periphery of said capsule and being disposed in said V-shaped groove without any fixed connection between said ridge and said housing, an opening in the bottom of said capsule which is surrounded by a lip seal, an element disposed in said opening and in contact with said lip seal for sealing the heat expansible material in said capsule, said element having its principal axis coincidental with the axis of said housing and having the inner end portion thereof disposed in contact with said heat expansible material and the outer end portion thereof disposed in contact with said housing, said capsule and said element being disposed in said housing without any fixed connection therebetween, with the inner surface of said capsule being subjected upon expansion of said heat expansible material to a pressure which is applied equally in all directions, the arrangement of said capsule in said housing with the principal axis of the capsule coincidental with the axis of said housing preventing turning of said capsule in said housing, said V-shaped ridge being adapted to move relative to said V-shaped groove upon the movement of said cushion and subsequent movement of said plunger by the heat expansible material.

2. The temperature responsive actuator defined in claim 1 wherein said element is in the form of a pin made from a heat conducting material, with the inner end portion thereof disposed in heat conducting contact with said heat expansible material and the outer end portion thereof disposed in heat conducting contact with said housing.

3. The temperature responsive actuator defined in claim 2 wherein said heat-conducting pin is provided with a bore which is closed on the inner end thereof, an electrically operated heating element in said bore, the closed end of said bore shielding said element from direct contact with said heat expansible material.

4. The temperature responsive actuator defined in claim 3 wherein said electrically operated heating element which is located in the bore of said heat conducting pin is in the form of an electrical heat conducting coil.

5. The temperature responsive actuator defined in claim 1 wherein said element is in the form of a pin made from a non-conducting material, and electrically operated heating means carried by said pin in heat conducting contact with said expansible material.

6. The temperature responsive actuator defined in claim 1 wherein said element includes a portion which extends outwardly from the outer surface of said housing through an opening provided therein, said last mentioned portion being in axial alignment with the axis of said piston.

7. The temperature responsive actuator defined in claim 5 wherein said electrically operated heating means includes an annular electrically operated heating ring carried by the inner end portion of said non-conducting pin.

8. The temperature responsive actuator defined in claim 5 wherein said electrically operated heating means includes an electrically operated heat conducting coil surrounding the inner end portion of said non-conducting pin.

9. The temperature responsive actuator defined in claim 1 wherein said element is in the form of a pin made from a heat conducting material, electrically operated heating means carried by and insulated from said pin, said heating means being arranged in heat conducting contact with said heat expansible material, said pin including an outwardly extending portion which extends from said housing through an opening provided therein, and heat dispensing means mounted on the outwardly extending portion of said pin for facilitating the removal of heat from said housing upon the de-energization of said electrically operated heating means.

10. The temperature responsive actuator defined in claim 9 wherein said heat dispersing means is in the form of an annular disc having a plurality of grooves on the outer periphery thereof.

11. The temperature responsive actuator defined in claim 9 wherein said heat dispersing means includes an element having a plurality of outwardly extending arms thereon.

12. The temperature responsive actuator defined in claim 9 wherein said heat dispersing means comprises a plurality of elements which are spaced apart by spacing members, said elements each having a plurality of outwardly extending arms thereon.

13. The temperature responsive actuator defined in claim 1 wherein said resilient cushion is in the form of an element separate from said capsule, said cushion having another face abutting said capsule.

14. The temperature responsive actuator defined in claim 1 wherein said ridge is in the form of an annular resilient solid ring separate from said capsule, said ring having an inner annular face abutting said capsule.

15. A temperature responsive actuator comprising an elongated hollow housing which is symmetrical about the longitudinal axis thereof, said housing including a cap having an outer surface which is part spherical on one end thereof and part cylindrical on the other end portion thereof and a cup-shaped body member which is part spherical, the spherical parts of said cap and said body member being provided with engageable laterally extending flanges and being joined together at the mating surfaces of said flanges, said housing defining a pair of axially aligned and connected chamber portions, one chamber portion being substantially spherical and including an endless transversely extending relatively shallow substantially V-shaped groove extending around the interior thereof along the line of joinder of said flanges, the other chamber portion terminating in a cylinder having a plunger extensibly movable therealong and having a throat forming an inner continuation of said cylinder and diverging from said cylinder to intersect said spherical chamber portion, a resilient capsule disposed in said housing and containing a heat expansible material therein, said capsule having a principal axis which is coincidental with the axis of said housing, said capsule being substantially spherical and in surface to surface contact with said spherical chamber portion, said capsule being provided on the exterior side thereof with a resilient cushion having a face which abuts the inner end of said plunger, said cushion being substantially located in and conforming to the shape of said throat, an opening in the bottom of said capsule which is surrounded by a radially inwardly extending tubular lip seal coaxial with said housing, an elongated element extending into said capsule through said opening and through said lip seal in continuous annular sealing contact with said lip seal for sealing the heat expansible material in said capsule, said element having its principal axis coincidental with the axis of said housing and having the inner end portion thereof disposed in contact with said heat expansible material and the outer end portion thereof disposed in contact with said housing, said capsule and said element being disposed in said housing without any fixed connection therebetween, with the inner surface of said capsule being subjected upon expansion of said heat expansible material to a pressure which is applied equally in all directions, the arrangement of said capsule in said housing with the principal axis of the capsule coincidental with the axis of said housing and with the axes of said element and lip seal also coincidental with the axis of said housing providing dynamic balance so as to prevent turning of said capsule in said housing.

16. The temperature responsive actuator defined in claim 15 wherein said element is in the form of a pin made from a heat conducting material, with the inner end portion thereof disposed in heat conducting contact with said heat expansible material and the outer end portion thereof disposed in heat conducting contact with said housing.

17. The temperature responsive actuator defined in claim 15 wherein said element is in the form of a pin made from a non-conducting material, and electrically operated heating means carried by said pin in heat conducting contact with said expansible material.

18. The temperature responsive actuator defined in claim 15 wherein said element is in the form of a pin made from a heat conducting material, electrically operated heating means carried by and insulated from said pin, said heating means being arranged in heat conducting contact with said heat expansible material, said pin including an outwardly extending portion which extends from said housing through an opening provided therein, and heat dispensing means mounted on the outwardly extending portion of said pin for facilitating the removal of heat from said housing upon the de-energization of said electrically operated heating means.

19. A temperature responsive actuator comprising a housing formed with a chamber and a hollow extension disposed in communication with said chamber, said hollow extension comprising a first section having a bore therethrough of substantially uniform cross section and a second section having a throat therethrough disposed between and in communication with said bore and said chamber, a piston slidably mounted in said bore and reciprocable therein, a resilient capsule disposed in said chamber and containing a heat expansible material therein, said capsule including a resilient incompressible projection disposed in said second section and integrally connected to a wall portion of said capsule, said projection provided with a substantially planar face provided with a chamfer extending along the edge thereof and disposed in abutting relationship against the inner face of said piston, said capsule also including a sealing sleeve integrally connected thereto and extending inwardly and in alignment with the axis of said piston, the peripheral surface of said sealing sleeve formed with at least one tapered surface angularly inclined relative to the axis of said sleeve, and a heat transfer pin disposed in said sealing sleeve for sealing the heat expansible material therein and having the inner end thereof disposed in heat conducting contact with said heat expansible material and the outer end portion thereof in heat conducting contact with said housing.

20. A temperature responsive actuator comprising a housing formed with a chamber and a hollow extension disposed in communication with said chamber, said hollow extension comprising a first section having a bore therethrough of substantially uniform cross section and a second section having a throat therethrough disposed between and in communication with said bore and said chamber, a piston slidably mounted in said bore and reciprocable therein, a resilient capsule disposed in said chamber and containing a heat expansible material therein, a resilient incompressible cushion disposed in said second section having one face thereof disposed in abutting relationship against the periphery of said resilient capsule and the other face thereof provided with a planar configuration and formed with a chamfer along the edges thereof and disposed in abutting relationship against the inner face of said piston, said capsule further including a sealing sleeve integrally connected thereto and extending inwardly and in alignment with the axis of said piston, the peripheral surface of said sealing sleeve formed with at least one tapered surface angularly inclined relative to the axis of said sleeve, and a heat transfer pin disposed in said sealing sleeve for sealing the heat expansible material therein and having the inner end thereof disposed in heat conducting contact with said heat expansible material and the other end portion thereof in heat conducting contact with said housing.

21. A temperature responsive actuator comprising a two-piece housing including a flanged cup-shaped cap and a flanged cup-shaped body member joined together at the mating flanged surfaces thereof defining therewith a chamber including a V-shaped groove extending around the interior thereof along the line of joinder of said cap and body member, said body member including a hollow extension comprising a first section having a bore therethrough of substantially uniform cross section and a second section having a throat therethrough disposed between and in communication with said bore and said chamber, a piston slidably mounted in said bore and reciprocable therein, a resilient capsule disposed in said chamber and containing a heat expansible material therein, said capsule including a resilient incompressible projection integrally connected to a wall portion of said capsule and disposed in said second section and provided with a substantially planar face having a chamfer extending along the edge thereof and disposed in abutting relationship against the inner face of said piston, a V-shaped ridge extending around the periphery of said capsule and integrally connected thereto and disposed in said V-shaped groove around the interior of said chamber, said capsule formed with a sealing sleeve integrally connected thereto and extending inwardly and in alignment with the axis of said piston, the peripheral surface of said sealing sleeve formed with at least one tapered surface angularly inclined relative to the axis of said sleeve, and a heat transfer pin disposed in said sealing sleeve for sealing the heat expansible material therein and having the inner end thereof disposed in heat conducting contact with said heat expansible material and the outer end portion thereof in heat conducting contact with said housing.

References Cited

UNITED STATES PATENTS

| 1,819,588 | 8/1931 | Bennett. | |
| 2,197,006 | 4/1940 | Peters et al. | 165—185 XR |
| 2,355,878 | 8/1944 | Livar | 60—23 XR |
| 2,477,882 | 8/1949 | La Brie | 277—212 XR |
| 2,736,604 | 2/1956 | Albright | 60—23 XR |
| 2,803,494 | 8/1957 | Scherer. | |
| 3,029,595 | 4/1962 | Sherwood | 60—23 XR |
| 3,075,348 | 1/1963 | Baker | 60—23 |

S. CLEMENT SWISHER, *Primary Examiner.*

U.S. Cl. X.R.

236—68; 277—212; 73—368.3